United States Patent [19]

Mizusaki

[11] Patent Number: 4,667,466
[45] Date of Patent: May 26, 1987

[54] QUICK FILL TYPE MASTER CYLINDER

[75] Inventor: Yoshinobu Mizusaki, Maruko, Japan

[73] Assignee: Nissin Kogyo Kabushiki Kaisha, Nagano, Japan

[21] Appl. No.: 688,929

[22] Filed: Jan. 4, 1985

[30] Foreign Application Priority Data

Jan. 9, 1984 [JP] Japan ............................ 59-1052[U]
Mar. 13, 1984 [JP] Japan ............................ 59-35662[U]

[51] Int. Cl.[4] ............................................. B60T 11/08
[52] U.S. Cl. ....................................... 60/578; 60/574; 60/585
[58] Field of Search ........................ 60/578, 574, 585

[56] References Cited

U.S. PATENT DOCUMENTS

| 4,085,770 | 5/1978 | Shaw | 60/574 |
| 4,373,333 | 2/1983 | Coleman | 60/578 |
| 4,455,831 | 6/1984 | Maehara | 60/578 |

FOREIGN PATENT DOCUMENTS

| 65891 | 12/1982 | European Pat. Off. | 60/585 |
| 118960 | 9/1979 | Japan | 60/574 |
| 86850 | 7/1981 | Japan | 60/585 |
| 194148 | 11/1982 | Japan | 60/578 |

Primary Examiner—Randall L. Green
Attorney, Agent, or Firm—Armstrong, Nikaido Marmelstein & Kubovcik

[57] ABSTRACT

An improved quick fill type master cylinder having a structure in which a piston consisting of a smaller diameter piston portion and a larger diameter piston portion is slidably fitted into a stepped cylinder bore to define a hydraulic pressure chamber as well as a hydraulic oil supply chamber therein, a relief port opening to the hydraulic pressure chamber and a supply port opening to the hydraulic oil supply chamber are placed in communication with an oil reservoir via a hydraulic oil flow passage formed longitudinally in a cylinder casing, and a valve device is incorporated in the hydraulic oil flow passage. The hydraulic oil flow passage is formed by drilling and the like from the rear end face of the cylinder casing and a valve chamber of the valve device is provided in the oil flow passage near outside opening thereof. In this valve chamber are disposed a pressure responsive valve and a one-way valve, constituting the valve device, so as to be movable for open and close almost along a center axis of the oil flow passage. A blind plug is fitted to the outside opening of the oil flow passage as an end wall of the valve chamber.

8 Claims, 4 Drawing Figures

QUICK FILL TYPE MASTER CYLINDER

BACKGROUND OF THE INVENTION

1. Field of the Invention

The present invention relates to a quick fill type master cylinder and more particularly to an improvement relating to a quick fill type master cylinder in which pressurized hydraulic oil is quickly filled in the hydraulic pressure chamber at the initial stage of actuation of the piston to eliminate any play in actuating devices such as wheel brake or the like within a short period of time.

2. Description of the Prior Art

A master cylinder of the above-mentioned type is disclosed, for instance, in official gazette of Japanese Utility Model Laid-Open No. 57-135459. The conventional master cylinder is constructed such that a cylinder bore including fore smaller diameter portion and rear larger diameter portion is provided in the cylinder casing, a piston including smaller diameter piston portion and larger diameter piston portion corresponding to the smaller and larger diameter bore portions is slidably fitted into the cylinder bore, and further that a valve device is incorporated in a hydraulic oil flow passage formed in the cylinder casing, the passage being adapted for communicating a reservoir with a relief port as well as with a supply port, the relief port being opened, when the piston reaches its predetermined retracted position, to a hydraulic pressure chamber formed at a position located forwardly of the smaller diameter piston portion while the supply port being opened to a hydraulic oil supply chamber formed between the smaller piston portion and the larger diameter piston portion. The valve device includes a pressure responsive valve adapted to open when hydraulic pressure in the hydraulic oil supply chamber increases above a predetermined level, one-way valve for allowing hydraulic oil to flow only in the direction from the reservoir to the hydraulic oil supply chamber, and a bypass of high resistance against hydraulic oil flow for establishing communication between the reservoir and the hydraulic oil supply chamber while bypassing the pressure responsive valve and the one-way valve. However, in this type of master cylinder, the valve chamber of the valve device is drilled in the cylinder casing from the direction crossing at certain angle relative to the hydraulic oil flow passage and both the pressure responsive valve and the one-way valve are arranged in the valve chamber to operate in the direction crossing the axis of the hydraulic oil flow passage. Therefore, such conventional master cylinder has drawbacks that the valve device is to be constructed in larger dimensions, hydraulic oil tends to flow unsmoothly, blind plugs have to be fitted to respective openings of the valve chamber and the hydraulic oil flow passage as opening to outside of the cylinder casing, necessitating more assembling steps and increased number of components uneconomically.

SUMMARY OF THE INVENTION

Hence, the present invention has been made with the foregoing background in mind and its object resides in providing an improved quick fill type master cylinder which is entirely free from drawbacks inherent to the conventional one, which is simple in structure and can operate at an excellently high efficiency.

To accomplish the above object there is proposed, according to the present invention, in a quick fill type master cylinder of the type comprising a cylinder casing; a stepped cylinder bore formed in the cylinder casing and including a fore smaller diameter portion and a rear larger diameter portion; a piston slidably fitted into the cylinder bore and having a smaller diameter piston portion and a larger diameter piston portion corresponding to the smaller diameter portion and the larger diameter portion of the cylinder bore, respectively; a reservoir; a hydraulic oil flow passage formed in the cylinder casing in the longitudinal direction thereof to establish communication between the reservoir and a relief port as well as a supply port, the relief port being opened, when the piston is at a predetermined retracted position, to a hydraulic pressure chamber formed forwardly of the smaller diameter piston portion, the supply port being opened to a hydraulic oil supply chamber formed between the smaller and larger diameter piston portions; and a valve device disposed in the hydraulic oil flow passage, wherein the valve device comprises a pressure responsive valve adapted to open when hydraulic pressure in the hydraulic oil supply chamber increases above a predetermined level, a one-way valve for allowing hydraulic oil to flow only in a direction from the reservoir to the hydraulic oil supply chamber, and a bypass having high flow resistance and adapted for establishing communication between the reservoir and the relief port while bypassing the pressure responsive valve and the one-way valve, the improvement which consists in that the hydraulic oil flow passage is drilled from a rear end face of the cylinder casing, a valve chamber is provided in the hydraulic oil flow passage near an outside opening thereof, in the valve chamber are disposed the pressure responsive valve and the one-way valve so as to be movable for open and close in a direction almost along a center axis of the hydraulic oil flow passage, and a blind plug serving as end wall of the valve chamber is fitted to the outside opening of the hydraulic oil flow passage.

With the above arrangement, the valve device can be constructed in an easier and compact manner and flow of hydraulic oil can be made smooth to enhance the efficiency of oil supply. Since the blind plug for the hydraulic oil flow passage serves also as end wall of the valve chamber, the number of steps for the plug mounting can be reduced to half of that of the conventional device and further the number of components is reduced to half to realize a cost reduction.

According to certain aspect of the invention, it can be arranged that the one-way valve is constituted by a valve seat formed on an inner end face of the valve chamber, a hollow valve body located opposite to the valve seat and a valve spring adapted to bias the hollow valve body toward the valve seat, which hollow valve body comprises a spherical portion located on the valve seat side and rotatably and slidably fitted to the valve chamber and a cylindrical portion extending continuously from the spherical portion and having a diameter smaller than that of the spherical portion, a communication passage being formed on the spherical portion for communicating between spaces defined in the valve chamber on the valve seat side and on the cylindrical portion side, and the pressure responsive valve being incorporated in the hollow valve body. Owing to the arrangement of the valve device made in that way the following advantageous features are obtainable.

Namely, since the one-way valve is constructed such that the spherical portion of the hollow valve body comes at its spherical surface in contact with the valve seat, excellently high sealability is assured between the hollow valve body and the valve seat irrespective of how the hollow valve body is inclined during operation of the one-way valve. As a result, quick filling or charging is achieved reliably. Further, the pressure responsive valve is incorporated in the hollow valve body so that both the valves can be assembled in the form of a unit. The hollow valve body can be located in the valve chamber at the predetermined position merely by fitting the spherical portion into the inner space of the valve chamber. Thus, both the valves can be mounted in place at an improved operational efficiency. Further, since the spherical portion of the hollow valve body is rotatably and slidably fitted into the valve chamber, the spherical portion is brought in line contact with the valve chamber whereby actuation of the one-way valve is carried out smoothly and stably at all times while restraining sliding resistance of the chamber wall relative to the hollow valve body to a minimum level. Any inclination of the hollow valve body has no adverse effect on actuation of the pressure responsive valve. Thus, the pressure responsive valve can operate smoothly and stably in the same manner as the one-way valve.

The above and other objects, features and advantages of the invention will become apparent from reading of the following detailed description in conjunction with the accompanying drawings.

BRIEF DESCRIPTION OF THE DRAWINGS

The accompanying drawings will be briefly described below.

FIGS. 1 and 2 illustrate a master cylinder according to one embodiment of the invention, wherein FIG. 1 is a vertical sectional view of the master cylinder and FIG. 2 is an enlarged sectional view of the valve device and associated components.

FIGS. 3 and 4 illustrate a valve device of a form modified from that of the first embodiment, wherein FIG. 3 is an enlarged sectional view thereof similar to FIG. 2 and FIG. 4 is an end view of the hollow valve body as seen in the direction identified by an arrow mark IV in FIG. 3.

DESCRIPTION OF THE PREFERRED EMBODIMENT

Now, the present invention will be described in a greater detail hereunder with reference to the accompanying drawings which illustrate a preferred embodiment thereof.

Figure 1:
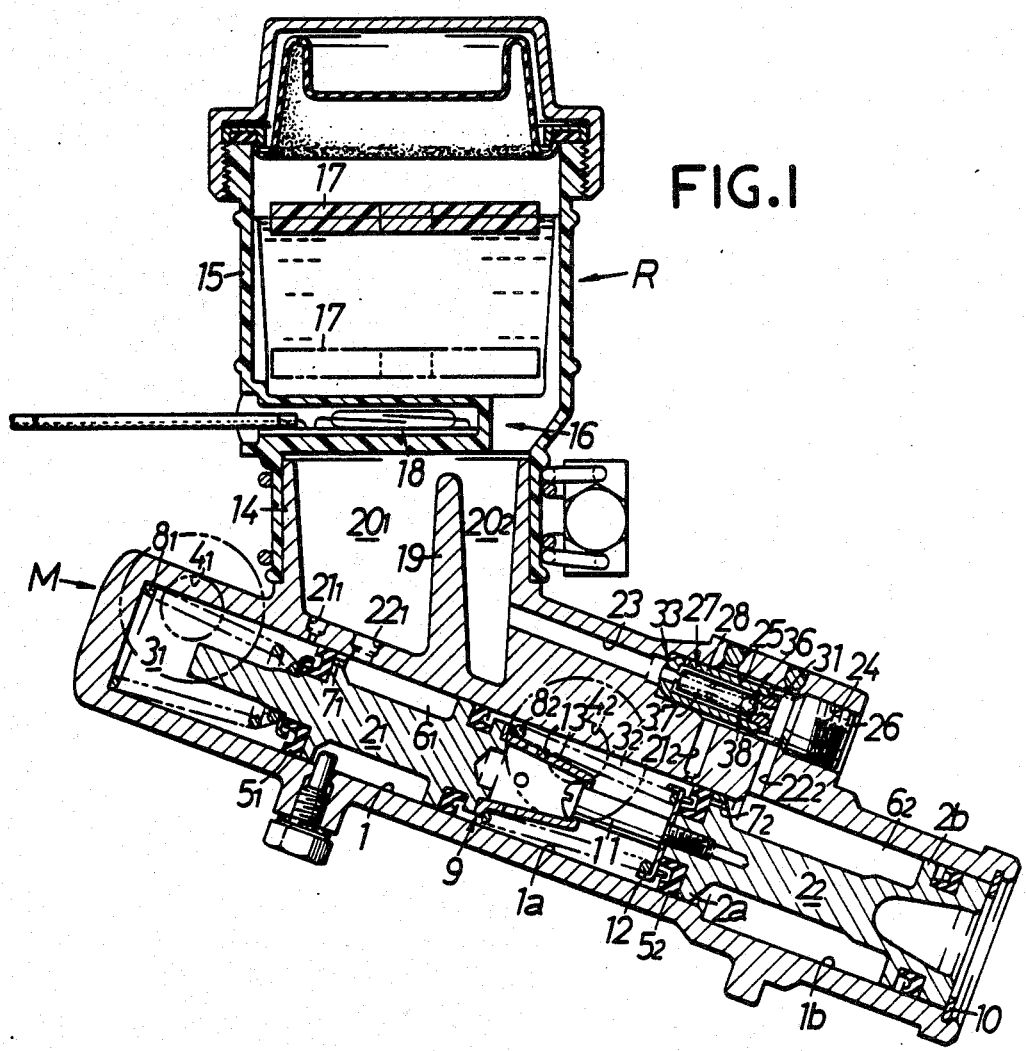

A master cylinder as illustrated in FIG. 1 is constructed as tandem type usable for dual brake system. Specifically, the master cylinder includes a cylinder casing M and a fore piston $2_1$ and a rear piston $2_2$ are slidably fitted in series in a cylinder bore 1 of the casing M. A fore hydraulic pressure chamber $3_1$ is defined between the fore piston $2_1$ and the fore end wall of the cylinder bore 1, while a rear hydraulic pressure chamber $3_2$ is defined between both the pistons $2_1$ and $2_2$. The hydraulic pressure chambers $3_1$ and $3_2$ have output ports $4_1$ and $4_2$ which are formed in communication with the dual system hydraulic braking circuit. The pistons $2_1$ and $2_2$ are provided with elastic piston cups $5_1$ and $5_2$ at their respective front ends and they have annular grooves formed at their intermediate portions. The annular groove of the piston $2_1$ defines a fore hydraulic oil supply chamber $6_1$ and the annular groove of the piston $2_2$ does a rear hydraulic oil supply chamber $6_2$ in the cylinder bore 1. The pistons $2_1$ and $2_2$ are formed with communication holes $7_1$ and $7_2$ by way of which the chambers $6_1$ and $6_2$ are in communication with the back sides of the piston cups $5_1$ and $5_2$, respectively.

A return spring $8_1$ adapted to bias the fore piston $2_1$ rearwardly is housed in the fore hydraulic pressure chamber $3_1$. To determine the extent of rearward movement of the fore piston $2_1$ a piston interval limiting device 9 is arranged in the space as defined between the fore and rear pistons $2_1$ and $2_2$. On the other hand, the extent of rearward movement of the rear piston $2_2$ is determined by abutment thereof against a stopper ring 10 which is fitted to the inner wall of the cylinder bore 1.

Specifically, the piston interval limiting device 9 is constituted by a stationary seat plate 12 fixedly secured by bolt 11 to the fore end of the rear piston $2_2$, a movable seat plate 13 mounted on the bolt in a manner slidable within a predetermined extent of stroke in the axial direction, and a return spring $8_2$ compressed between both the seat plates 12 and 13. It should be noted that set load of the return spring $8_2$ is determined larger than that of the return spring $8_1$. The return spring $8_2$ normally works to expand the interval between both the seat plates 12 and 13 to a maximum extent so as to hold both the pistons $2_1$ and $2_2$ at their predetermined retracted positions in cooperation with the return spring $8_1$.

A cylindrical auxiliary reservoir 14 is made integral with and on the upper side of the cylinder casing M at a position adjacent the fore hydraulic pressure chamber $3_1$ and a main reservoir 15 made of transparent plastic material is mounted on the upper end portion of auxiliary reservoir 14, which reservoirs together constitute a reservoir R. Specifically, the main reservoir 15 is provided with a conventional float type alarm device 16 for signalling abnormal reduction of oil stored therein. When oil level in the main reservoir 15 goes down below a predetermined level, the float 17 with a magnet attached thereto is actuated in response thereby to close a switch 18. Thus, an alarm lamp which is not shown in the drawings is caused to be turned on.

The auxiliary reservoir 14 is divided into fore and rear oil reservoir chambers $20_1$ and $20_2$ by means of a partition wall 19 which is made integral with the cylinder casing M. When the pistons $2_1$ and $2_2$ assume their predetermined rear end positions, the fore oil reservoir chamber $20_1$ communicates with the fore hydraulic pressure chamber $3_1$ and the fore hydraulic oil supply chamber $6_1$ via relief port $21_1$ and supply port $22_1$, respectively, while a hydraulic oil flow passage 23 formed longitudinally in the cylinder casing M so as to extend from the rear oil reservoir chamber $20_2$ rearwardly communicates with the rear hydraulic pressure chamber $3_2$ as well as the rear hydraulic oil supply chamber $6_2$ via relief port $21_2$ and supply port $22_2$, respectively.

As is apparent from the drawings, the rear piston $2_2$ includes a fore smaller diameter piston portion $2_a$ and a rear larger diameter piston portion $2_b$ with the rear hydraulic oil supply chamber $6_2$ interposed therebetween and the piston cup $5_2$ and the communication hole $7_2$ are arranged on the smaller diameter piston portion $2_a$. The rear part of the cylinder bore 1 is also designed in a stepped structure including a smaller diameter portion $1_a$ and a larger diameter portion $1_b$ correspondingly to the smaller and larger diameter piston portions $2_a$ and $2_b$.

The hydraulic oil flow passage 23 is formed by drilling the cylinder casing M from the rear end face thereof and a cylindrical valve chamber 25 is formed in the passage 23 at the position located near an outer opening 24. The opening 24 of passage 23 is normally kept closed with a blind plug 26 which is threadably fitted thereto. Accordingly, the blind plug 26 serves also as an end wall for the valve chamber 25. The relief port $21_1$ and the supply port $22_2$ are in communication with the valve chamber 25.

A valve device 27 is housed in the valve chamber 25 to control communication between the rear hydraulic oil reservoir chamber $20_2$ and the rear hydraulic oil supply chamber $6_2$.

Figure 2:
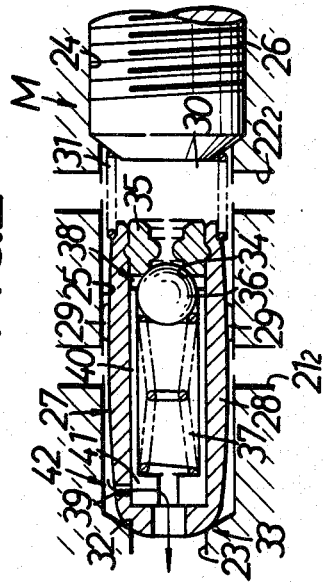

As illustrated in more details in FIG. 2, the valve device 27 includes a cylindrical hollow valve body 28 of which both ends are opened. The cylindrical valve body 28 has a plurality of projections 29 formed on the outer peripheral surface thereof so that the body 28 is fitted into the valve chamber with the aid of the projections 29 in a slidable fashion in the direction of center axis of the hydraulic oil flow passage 23. Further, the valve device 27 includes a spring holding portion 30 located in the space as defined between the cylindrical valve body 28 and the blind plug 26, the spring holding portion 30 communicating with the supply port $22_2$. A valve spring 31 is housed in the spring holding portion 30 in a compressed state so that the semispherical end face of the cylindrical valve body 28 is brought in abutment against a tapered valve seat 32 under the effect of resilient force of the valve spring 31, the tapered valve seat 32 being formed around an opening edge portion of the valve chamber 25 on the side closer to the rear oil reservoir chamber $20_2$. Thus, the cylindrical valve body 28, the valve seat 32 and the valve spring 31 constitute a oneway valve 33 which allows hydraulic oil to flow only in the direction from the rear oil reservoir chamber $20_2$ to the rear hydraulic oil supply chamber $6_2$.

The relief port $21_2$ is in communication with the valve chamber 25 at a position outside the cylindrical valve body 28.

The cylindrical valve body 28 is fitted with an annular member 35 around the inner periphery of an opening part thereof as exposed to the spring holding portion 30. The annular member 35 has a valve seat 34 formed thereon and a ball valve body 36 is housed in the cylindrical valve body 28 so as to oppose the valve seat 34. A valve spring 37 is disposed to resiliently bias the ball valve body 36 toward the valve seat 34. Thus, the ball valve body 36, the valve seat 34 and the valve spring 37 constitute a pressure responsive valve 38 which is caused to open when pressure in the rear hydraulic oil supply chamber $6_2$ increases above a predetermined level.

Further, the cylindrical valve body 28 has an orifice 39 formed in its peripheral wall at position located in the vicinity of the valve seat 32 so that both the outside and inside of the cylindrical valve body 28 communicate with one another via the orifice 39 and clearances 41 as defined between adjacent ribs 40 formed on the inner peripheral surface of the cylindrical valve body 28. Thus, both the outside and inside of the cylindrical valve body 28 and the orifice 39 constitute a bypass 42 of high flow resistance. By way of this bypass 42 the rear oil reservoir chamber $20_2$ and the relief port $21_2$ can communicate with one another while bypassing the one-way valve 33 and the pressure responsive valve 38.

Next, operation of the master cylinder according to the illustrated embodiment of the invention will be described below.

When the rear piston $2_2$ is displaced forwardly from the illustrated rear end position by actuating a brake pedal which is not shown in the drawings, both the pistons $2_1$ and $2_2$ move forwardly while compressing the return springs $8_1$ and $8_2$. After the piston cups $5_1$ and $5_2$ come to positions to close the relief ports $21_1$ and $21_2$, hydraulic pressure is generated in the hydraulic pressure chambers $3_1$ and $3_2$ in dependence on the amount of movement of the pistons $2_1$ and $2_2$. Thus generated hydraulic pressure is then outputted from the output ports $4_1$ and $4_2$ whereby associated wheel brakes are actuated.

More specifically, as the larger diameter piston portion $2_b$ of the rear piston $2_2$ is advanced, the effective volume of the rear hydraulic oil supply chamber $6_2$ is caused to decrease. At this time, due to the fact that the orifice 39 has high flow resistance and the semispherical end face of the cylindrical valve body 28 comes in pressure contact with the tapered valve seat 32 to exhibit an excellent sealability, most of the hydraulic oil discharged from the rear hydraulic oil supply chamber $6_2$ does not return to the hydraulic oil flow passage 23 but it is fed under pressure through the communication hole $7_2$ into the rear hydraulic pressure chamber $3_2$ while flexing the outer circumferential part of the piston cup $5_2$. As a result, hydraulic oil is quickly filled in the rear hydraulic pressure chamber $3_2$ whereby output hydraulic pressure is generated at the output ports $4_1$ and $4_2$ at the initial actuation stage. This enables play in each of the wheel brakes to be eliminated within a short period of time. Thus, they are actuated without time lag.

When hydraulic pressure in the rear hydraulic oil supply chamber $6_2$ increases above a predetermined valve opening pressure of the pressure responsive valve 38 due to increase of hydraulic pressure in the rear hydraulic pressure chamber $3_2$, the ball valve body 36 is displaced in the leftward direction as seen in FIG. 2 against resilient force of the valve spring 37 whereby the pressure responsive valve 38 is kept opened. Thus, hydraulic oil discharged from the rear hydraulic oil supply chamber $6_2$ is caused to flow back to the rear oil reservoir chamber $20_2$ via supply port $22_2$, pressure responsive valve 38 and hydraulic oil flow passage 23 so that hydraulic pressure in the rear hydraulic oil supply chamber $6_2$ is inhibited from excessive increase. As a result, forward movement of the rear piston $2_2$ is achieved without any hindrance encountered.

When the brake pedal is released from the depressed state, both the pistons $2_1$ and $2_2$ are caused to return to the respective predetermined retracted positions under the effect of resilient force of the return springs $8_1$ and $8_2$. During return movement of the pistons $2_1$ and $2_2$ hydraulic pressure in the fore and rear hydraulic pressure chambers $3_1$ and $3_3$ decreases and the outer circumferential parts of the pistons $5_1$ and $5_2$ are deformed forwardly due to differential pressure existing across them whereby there is produced clearances between the inner wall of the cylinder bore 1 and the outer surfaces of the piston cups $5_1$ and $5_2$. As a result, hydraulic oil in the fore hydraulic oil reservoir chamber $20_1$ is supplied into the fore hydraulic chamber $3_1$ via supply port $22_1$, fore hydraulic oil supply chamber $6_1$ and communication hole $7_1$, while hydraulic oil in the spring holding portion 30 is supplied into the rear hydraulic pressure chamber $3_2$ via supply port $22_2$, rear hydraulic oil supply chamber $6_2$ and communication hole $7_2$. At this moment hydraulic oil in the rear hydraulic oil reservoir chamber $20_2$ acts to displace the cylindrical valve body 28 in the rightward direction as seen in FIG. 2 against resilient force of the valve spring 31 so that the one-way valve 33 is kept in the opened state. Thus, the oil flows into the spring holding portion 30 smoothly through the hydraulic oil flow passage 23 and the annular space around the outer surface of the cylindrical valve body 28.

Once the pistons $2_1$ and $2_2$ return to their predetermined retracted positions, the relief ports $21_1$ and $21_2$ are exposed to the hydraulic pressure chambers $3_1$ and $3_2$ and thereby any excessive amount of hydraulic oil supplied into the fore hydraulic pressure chamber $3_1$ is discharged into the fore oil reservoir chamber $20_1$ via relief port $21_1$ while any excessive amount of hydraulic oil supplied into the rear hydraulic pressure chamber $3_2$ is discharged into the rear oil reservoir chamber $20_2$ via relief port $21_2$ and bypass port 42 (see an arrow mark in FIG. 2).

Figure 3:
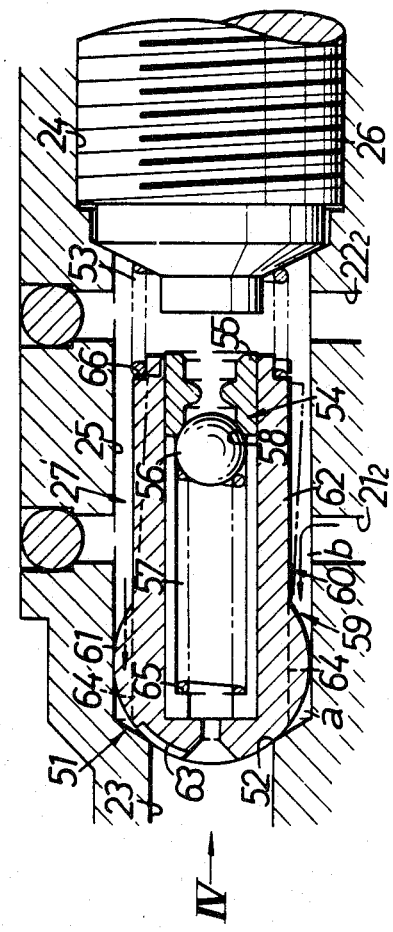
Figure 4:
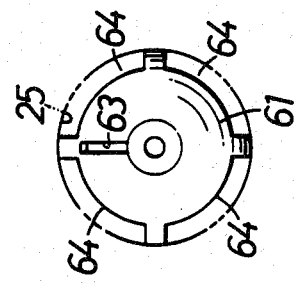

Next, FIGS. 3 and 4 illustrate a modified form of the valve device 27 according to the above-mentioned embodiment as illustrated in FIGS. 1 and 2.

In this modified form a valve device 27' includes a one-way valve 51 which is constituted by a valve seat 52 formed on the inner end face of the valve chamber 25 located in the proximity of the rear oil reservoir chamber $20_2$, a cylindrical hollow valve body 60 located opposite to the valve seat 52 and a valve spring 53 adapted to normally bias the cylindrical hollow valve body 60 toward the valve seat 52. The hollow valve body 60 is located on the side near the valve seat 52 and comprises a spherical portion 61 rotatably and slidably fitted in the valve chamber 25 and a cylindrical portion 62 extending continuously from the spherical portion 61 and having a diameter smaller than that of the latter. The cylindrical portion 62 is formed with a step 66 at the end face thereof located opposite to the blind plug 26 and a valve spring 53 is compressed between the step 66 and the blind plug 26 so that the spherical portion 61 is normally brought in contact with the valve seat 52 under the effect of resilient force of the valve spring 53 to shut off the rear oil reservoir chamber $20_2$ from the rear oil supply chamber $6_2$. Further, the spherical portion 61 is formed with four slit-like communication passages 64 by way of which a space a in the valve chamber 25 as located on the valve seat side communicates with a space b located on the cylindrical portion side. As the spherical portion 61 is moved away from the valve seat 52, hydraulic oil in the hydraulic oil flow passage 23 upstream of the valve chamber 25 or on the side of the rear oil reservoir chamber $20_2$ is introduced into the space b located on the cylindrical portion side via the communication passages 64.

The cylindrical portion 62 is fitted with a valve seat member 55 at an opening thereof which is located opposite to the blind plug 26.

A pressure responsive valve 54 is incorporated in the hollow valve body 60. Specifically, the pressure responsive valve 54 is constituted by a valve seat 58 formed on the inner end face of the valve seat member 55, a ball valve body 56 located opposite to the valve seat 58 and a valve spring 57 compressed between the ball valve body 56 and a step 65 formed in the spherical portion 61 so as to bias the ball valve body 56 toward the valve seat 58. Normally, the ball valve body 56 is brought in contact with the valve seat 58 under the effect of resilient force of the valve spring 57 so that the rear oil supply chamber $6_2$ is shut off from the rear oil reservoir chamber $20_2$.

Further, the valve device 27' includes a bypass 59 which essentially comprises space b in the valve chamber 25 located on the cylindrical portion side, communication passages 64, space a located on the valve seat side and slit 63 formed on the foremost end face of the spherical portion 61. The slit 63 has a very small width and serves to establish communication between the oil flow passage 23 and the space a located on the valve seat side in the valve chamber 25 at all times.

Operation of the valve device 27' is substantially the same as that of the valve device 27 according to the embodiment as illustrated in FIGS. 1 and 2. In this modified form, when the brake pedal is released from the depressed state, the piston $2_2$ initiates its return movement toward the retracted position and thereby hydraulic oil in the space b located on the cylindrical portion side is supplied into the rear hydraulic pressure chamber $3_2$ via supply port $22_2$, rear oil supply chamber $6_2$ and communication hole $7_2$. At this moment, hydraulic oil in the rear oil reservoir chamber $20_2$ acts to displace the hollow valve body 60 in the rightward direction as seen in FIG. 3 against resilient force of the valve spring 53 whereby the one-way valve 51 is kept in the opened state. As a result, the oil is smoothly introduced into the space b located on the cylindrical portion side in the valve chamber 25 from the upstream side of the hydraulic oil flow passage 23. Since the spherical portion 61 of the one-way valve 51 is in line contact with the inner wall of the valve chamber 25, resistance against sliding movement of the hollow valve body 60 is very small so that operation of the hollow valve body 60 is carried out smoothly and stably.

Since the one-way valve 51 is constructed such that the spherical portion 61 comes at its spherical surface in contact with the valve seat 52, a reliable seal is assured between the spherical portion 61 and the valve seat 52 even when the hollow valve body 60 is inclined during operation of the master cylinder as illustrated by chain lines in FIG. 3. Further, such inclination of the hollow valve body 60 has no adverse effect on operation of the pressure responsive valve 54. Therefore, the valve 54 can operate smoothly and stably.

Incidentally, the slit 63 constituting the bypass 59 may be replaced with an orifice which extends through the peripheral wall structure of the cylindrical portion 62 of the hollow valve body 60.

The present invention has been described above with respect to a tandem type master cylinder. However, it should not be limited only to this. Alternatively, it may be applied to a single piston type master cylinder.

What is claimed is:

1. In a quick fill type master cylinder of the type comprising a cylinder casing; a stepped cylinder bore formed in the cylinder casing and including a fore smaller diameter portion and a rear larger diameter portion; a piston slidably fitted into said cylinder bore and having a smaller diameter piston portion and a larger diameter piston portion coresponding to the smaller diameter portion and the larger diameter portion of the cylinder bore, respectively; a reservoir provided above the cylinder bore; a hydraulic oil flow passage formed in the cylinder casing to extend in the longitudinal direction thereof substantially along an axis of said cylinder bore for establishing communication between said reservoir and a relief port as well as a supply port, the relief port being opened, when the piston is at a predetermined retracted position, to a hydraulic pressure chamber formed forwardly of the smaller diameter piston portion, said supply port being opened to a hydraulic oil supply chamber formed between the smaller and larger diameter piston portions; and a valve device disposed in the hydraulic oil flow passage, wherein the valve device comprises a pressure responsive valve adapted to open when hydraulic pressure in the hydraulic oil supply chamber increases above a predetermined level, a one-way valve for allowing hydraulic oil to flow only in a direction from the reservoir to the hydraulic oil supply chamber, and a bypass having high flow resistance and adapted for establishing communication between the reservoir and the relief port while bypassing the pressure responsive valve and the one-way valve, the improvement which consists in that the hydraulic oil flow passage is drilled from a rear end face of the cylinder casing, a valve chamber is provided in the hydraulic oil flow passage near an outside opening thereof, in the valve chamber are disposed the pressure responsive valve and the one-way valve so as to be operable for opening and closing actions in a direction almost along a center axis of the hydraulic oil flow passage, and a blind plug serving as end wall of the valve chamber is fitted to the outside opening of the hydraulic oil flow passage, wherein said one-way valve comprises a hollow cylindrical body and opposite axial ends which is axially slidably fitted into said valve chamber so as to define an axial communication passage around an outer periphery of the cylindrical body for connection between said reservoir and said hydraulic oil supply chamber at the time of opening of the one-way valve, one of the axial ends of the body being normally urged by a spring toward sealing abutment against a valve seat formed at an inner end face of the valve chamber, said pressure responsive valve being incorporated in a hollow interior of said body of the one-way valve extending between openings provided at said respective axial ends of the body, so that the valve device is formed as a unit.

2. A master cylinder as defined in claim 1, wherein said one axial end of the body of the one-way valve is formed to have a spherical surface for line contact with said valve seat.

3. A master cylinder as defined in claim 1, wherein said cylindrical body is formed to have a substantially uniform outer diameter over a substantially entire axial length thereof.

4. A master cylinder as defined in claim 3, wherein said communication passage is in communication with said relief port and said bypass is formed as an orifice provided through a cylindrical portion of said cylindrical body between the communication passage and the hollow interior of the body.

5. A master cylinder as defined in claim 1, wherein said one axial end of the cylindrical body is formed into a spherical shape and is placed in rotatable and slidable contact with an inner peripheral wall of the valve chamber to divide said communication passage into a space on the side of the reservoir and a space on the side of the hydraulic oil supply chamber, means being provided on said spherical end for connecting said two spaces.

6. A master cylinder as defined in claim 5, wherein said communication passage is in communication with said relief port and said bypass is formed as a slit provided on the surface of the spherical end of the cylindrical body to extend between the reservoir side space of the communication passage and the hydraulic oil flow passage leading to the reservoir.

7. A master cylinder as defined in claim 1, wherein said pressure responsive valve comprises a valve seat forming member mounted to said opening on the other axial end of the cylindrical body, a ball valve body and a spring disposed in the hollow interior of the cylindrical body to urge the ball valve body toward the valve seat forming member.

8. A master cylinder as defined in claim 1, wherein said cylindrical body is loosely fitted into said valve chamber and is carried on said cylinder casing at its opposite axial ends, said spring being compressed between the other axial end of the cylindrical body and said blind plug.

* * * * *